(12) United States Patent
Zhao et al.

(10) Patent No.: US 12,408,069 B2
(45) Date of Patent: Sep. 2, 2025

(54) INFORMATION PROCESSING METHOD, DEVICE AND APPARATUS, AND COMPUTER-READABLE STORAGE MEDIUM

(71) Applicant: DATANG MOBILE COMMUNICATIONS EQUIPMENT CO., LTD., Beijing (CN)

(72) Inventors: Yali Zhao, Beijing (CN); Da Wang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 460 days.

(21) Appl. No.: 17/802,914

(22) PCT Filed: Feb. 26, 2021

(86) PCT No.: PCT/CN2021/078236
§ 371 (c)(1),
(2) Date: Aug. 26, 2022

(87) PCT Pub. No.: WO2021/170108
PCT Pub. Date: Sep. 2, 2021

(65) Prior Publication Data
US 2023/0092370 A1 Mar. 23, 2023

(30) Foreign Application Priority Data
Feb. 28, 2020 (CN) .......................... 202010131484.9

(51) Int. Cl.
*H04W 28/02* (2009.01)
*H04W 28/06* (2009.01)

(52) U.S. Cl.
CPC ....... *H04W 28/0236* (2013.01); *H04W 28/06* (2013.01)

(58) Field of Classification Search
CPC . H04W 28/0236; H04W 28/06; H04W 72/40; H04W 72/569; H04W 28/0967;
(Continued)

(56) References Cited

U.S. PATENT DOCUMENTS

| 2020/0245188 A1 | 7/2020 | Zhang et al. |
| 2021/0022131 A1 | 1/2021 | Liu et al. |

(Continued)

FOREIGN PATENT DOCUMENTS

| CN | 106454687 A | 2/2017 |
| CN | 110139369 A | 8/2019 |

(Continued)

OTHER PUBLICATIONS

International Search Report for PCT Application PCT/CN2021/078236 issued on May 20, 2021, and its English Translation provided by WIPO.
(Continued)

*Primary Examiner* — Jay P Patel
(74) *Attorney, Agent, or Firm* — Ladas & Parry, LLP

(57) ABSTRACT

An information processing method, device and apparatus, and a computer-readable storage medium are provided. The method includes: for a new data transmission resource of a sidelink interface, selecting a sidelink destination ID according to a CSI MAC CE of the sidelink interface; or, for the new data transmission resource of the sidelink interface, in case that a transport block (TB) transmitted at the new data transmission resource includes a CSI MAC CE, performing a packet discard decision according to the included CSI MAC CE.

18 Claims, 4 Drawing Sheets

(58) Field of Classification Search
CPC . H04W 40/12; H04W 28/0875; H04W 76/14; H04W 4/70; H04W 28/10; H04L 1/0026; H04L 1/1671; H04L 1/1685; H04L 1/1854; H04L 1/1864; H04L 1/1812
See application file for complete search history.

(56) References Cited

U.S. PATENT DOCUMENTS

| | | | | |
|---|---|---|---|---|
| 2021/0105790 | A1* | 4/2021 | Lin | H04W 72/56 |
| 2022/0183030 | A1* | 6/2022 | Lee | H04W 72/1263 |
| 2022/0417949 | A1* | 12/2022 | Zhang | H04W 72/1263 |

FOREIGN PATENT DOCUMENTS

| | | |
|---|---|---|
| CN | 110351684 A | 10/2019 |
| CN | 110690944 A | 1/2020 |
| WO | 2019029432 A1 | 2/2019 |
| WO | 2020033088 A1 | 2/2020 |

OTHER PUBLICATIONS

Written Opinion for PCT Application PCT/CN2021/078236 issued on May 20, 2021, and its English Translation provided by WIPO.
International Preliminary Report on Patentability for PCT/CN2021/078236 issued on Aug. 30, 2022, and English translation provided by WIPO.
First Office Action for Chinese Patent Application 202010131484.9 issued by the Chinese Patent Office on Apr. 7, 2022, and its English translation provided by Global dossier.
Extended European Search Report for the corresponding European Patent Application No. 21760363.8 issued by the European Patent Office on Jul. 4, 2023.
"Remaining Issued of Sidelink CSI Reporting," 3GPP TSG-RAN WG2 Meeting #109, R2-2000229, Athens, Greece, Feb. 24-28, 2020, Agenda Item: 6.4.3.1, Source: Samsung, all pages.
"Further Discussion on the Sidelink CSI reporting related issues," 3GPP TSG-RAN WG2 Meeting#109 electronic R2-2000711, Feb. 24-Mar. 6, 2020, Agenda Item: 6.4.3.1, Source: Huawei, HiSilicon, all pages.
"Summary of contributions to MAC for 5G V2XX with NR Sidelink," 3GPP TSG-RAN WG2 #109-e, draft3_R2-200xxxx R2-2001962, Online, Feb. 24-Mar. 6, 2020, Agenda Item: 6.4.3.1, LG Electronics Inc. (Rapporteur), all pages.
First Japanese Office Action for the corresponding Japanese Patent Application No. 2022-552168 issued by the Japanese Patent Office on Sep. 5, 2023, and its English Translation provided by the Foreign Associate.
"Allow padding when UL grant size is larger than 8 bytes," 3GPP TSG-RAN2 Meeting #104, R2-1818776 revision of R2-1816251, Spokane, USA, Nov. 12-16, 2018, all pages.

* cited by examiner

INFORMATION PROCESSING METHOD, DEVICE AND APPARATUS, AND COMPUTER-READABLE STORAGE MEDIUM

CROSS-REFERENCE TO RELATED APPLICATIONS

The present application is the U.S. national phase of PCT Application No. PCT/CN2021/078236 filed on Feb. 26, 2021, which claims a priority to Chinese patent application No. 202010131484.9 filed on Feb. 28, 2020, the disclosures of which are incorporated herein by reference in their entireties.

TECHNICAL FIELD

The present disclosure relates to the field of communication technologies, and in particular, to an information processing method, device and apparatus, and a computer-readable storage medium.

BACKGROUND

In order to communicate more efficiently, sidelink between user equipment (UEs) is introduced. For ease of description, a sidelink link between UEs is defined as a sidelink, and a corresponding wireless interface is called a sidelink interface (also called a sidelink interface). A cellular communication link between a network device and a UE is a Uu link, and its corresponding interface is called a Uu interface. As shown in FIG. 1, sidelink between UE1 and UE2 is carried out through a sidelink, and communication between the network device and the UE1 or UE2 is carried out through the Uu link.

For the sidelink, in order to enable the UE1 to know channel quality of the sidelink interface between the UE1 and the UE2, the UE2 needs to feed back channel state information (CSI) to the UE1. The CSI is transmitted through a media access control (MAC) control unit (CE).

For CSI MAC CE, a latency limit, i.e., latency bound, is introduced at the physical layer. For the sidelink interface, there is no clear solution in the related art as to how to consider the latency bound of the CSI MAC CE when performing the sidelink interface scheduling.

SUMMARY

Embodiments of the present disclosure provide an information processing method, device and apparatus, and a computer-readable storage medium, which can ensure that all transmittable CSI MAC CEs do not exceed their corresponding latency bounds, thereby avoiding unnecessary transmissions of CSI MAC CEs.

According to a first aspect, one embodiments of the present disclosure provides an information processing method, performed by a user equipment (UE), including:

for a new data transmission resource of a sidelink interface, selecting a sidelink destination ID according to a CSI MAC CE of the sidelink interface; or, for the new data transmission resource of the sidelink interface, in case that a transport block (TB) transmitted at the new data transmission resource includes a CSI MAC CE, performing a packet discard decision according to the included CSI MAC CE.

For the new data transmission resource of the sidelink interface, the selecting the sidelink destination ID according to the CSI MAC CE of the sidelink interface, includes:

In case that only CSI MAC CEs need to be transmitted on the sidelink interface, selecting a CSI MAC CE with a highest priority from the CSI MAC CEs, as a first target, and taking a sidelink destination ID corresponding to the first target as the sidelink destination ID; or, in case that both CSI MAC CEs and logical channel data need to be transmitted simultaneously on the sidelink interface, comparing priorities of the CSI MAC CEs and logical channels to determine a first target with a highest priority, and taking a sidelink destination ID corresponding to the first target as the sidelink destination ID.

in case that the first target includes at least one CSI MAC CE, the taking the sidelink destination ID corresponding to the first target as the sidelink destination ID, includes:

selecting a target CSI MAC CE from the at least one CSI MAC CE according to UE implementation, and taking a sidelink destination ID corresponding to the target CSI MAC CE as the sidelink destination ID; or, for each CSI MAC CE, calculating a difference A1 between a moment when the CSI MAC CE is triggered and a moment of a new data transmission on the sidelink interface, and calculating a difference A2 between a latency bound corresponding to the CSI MAC CE and the A1, and selecting a sidelink destination ID corresponding to a CSI MAC CE with a smallest A2 as the sidelink destination ID; or, for each CSI MAC CE, determining a logical channel with a highest priority, which belongs to the same destination ID as each CSI MAC CE; comparing the priorities of the logical channels with the highest priorities selected for each CSI MAC CE to determine a target logical channel, and taking a sidelink destination ID corresponding to the target logical channel as the sidelink destination ID.

For the new data transmission resource of the sidelink interface, in case that the TB transmitted at the new data transmission resource includes the CSI MAC CE, performing the packet discard decision according to the included CSI MAC CE, includes:

in case that the included CSI MAC CE satisfies a first condition, performing transmission of the TB on the new data transmission resource of the sidelink interface; otherwise, discarding the TB.

The selecting the CSI MAC CE with the highest priority from the CSI MAC CEs, as the first target, includes: selecting a CSI MAC CE with a highest priority from CSI MAC CEs that meet a first condition, as the first target; or, the comparing priorities of the CSI MAC CEs and logical channels to determine the first target with the highest priority, includes: determining CSI MAC CEs that satisfy a first condition, comparing priorities of all the CSI MAC CEs that meet the first condition and the logical channels to determine the first target with the highest priority.

The first condition includes:

a timer is started at a moment when a CSI MAC CE is triggered, and the timer does not expire at a moment of a new data transmission on the sidelink interface, wherein a duration of the timer is equal to a latency bound of the CSI MAC CE; or, a difference between the moment of the new data transmission on the sidelink interface and the moment when the CSI MAC CE is triggered, is less than or equal to the latency bound of the CSI MAC CE.

The latency bound of the CSI MAC CE is determined in a manner including:
receiving configuration information from a network device, wherein the configuration information is configured to configure the latency bound of the CSI MAC CE, and the latency bound of the CSI MAC CE is configured according to at least one of the following manners:
configured based on the UE;
configured based on a destination ID of the UE's sidelink interface;
configured based on a source ID and a destination ID of the UE's sidelink interface;
configured based on a destination ID and a cast type of the UE's sidelink interface;
configured based on a source ID, a destination ID and a cast type of the UE's sidelink interface.

The configuration information further includes at least one of the following information:
HARQ feedback configuration corresponding to the CSI MAC CE;
priority of the CSI MAC CE;
scheduling request resource configuration corresponding to the CSI MAC CE;
wherein the HARQ feedback configuration is configured to configure enabling or disabling HARQ feedback for the CSI MAC CE.

The latency bound of the CSI MAC CE is determined in a manner including:
determining the latency bound of the CSI MAC CE according to an agreement.

The agreement further includes at least one of the following information:
HARQ feedback configuration corresponding to the CSI MAC CE;
priority of the CSI MAC CE;
scheduling request resource configuration corresponding to the CSI MAC CE;
wherein the HARQ feedback configuration is configured to configure enabling or disabling HARQ feedback for the CSI MAC CE.

The comparing priorities of the CSI MAC CEs and logical channels to determine the first target with the highest priority, includes: determining logical channels that satisfy a second condition, comparing priorities of the CSI MAC CE and all the logical channels that meet the second condition to determine the first target with the highest priority; or,
for each CSI MAC CE, the determining the logical channel with the highest priority, which belongs to the same destination ID as each CSI MAC CE, includes: for each CSI MAC CE, determining a logical channel with a highest priority, which belongs to the same destination ID as each CSI MAC CE and satisfies the second condition;
wherein the second condition includes one or more of the following:
in case that the new data transmission resource of the sidelink interface is a Type1 pre-configured grant, an LCP restriction parameter of the logical channel includes a Type1 preconfigured grant;
in case that the new data transmission resource of the sidelink interface is a pre-configured grant, an LCP restriction parameter of the logical channel includes an index of the preconfigured grant;
there is data transmittable on the logical channel;

the number of available tokens in a token bucket corresponding to the logical channel is greater than zero.

For the new data transmission resource of the sidelink interface, the selecting the sidelink destination ID according to the CSI MAC CE of the sidelink interface, further includes:
for a selected sidelink destination ID, determining CSI MAC CEs allowed to be transmitted in the sidelink destination ID, wherein the CSI MAC CEs allowed to be transmitted in the sidelink destination ID are triggered by sidelink interface control information (SCI) for scheduling the sidelink destination ID, and satisfy at least one of the following conditions:
a timer is started at a moment when the CSI MAC CE is triggered, and the timer does not expire at a moment of a new data transmission on the sidelink interface, wherein a duration of the timer is equal to a latency bound of the CSI MAC CE;
a difference between the moment of the new data transmission on the sidelink interface and the moment when the CSI MAC CE is triggered, is less than or equal to the latency bound of the CSI MAC CE.

The method further includes:
when performing resource allocation in the sidelink destination ID, performing a first round of resource allocation according to a descending order of priorities of CSI MAC CEs and/or logical channels;
wherein during the first round of resource allocation, allocation of resources to the logical channels is limited by prioritized bit rate (PBR) of the logical channels, and allocation of resources to the CSI MAC CE is not limited by the PBR.

The method further includes:
in case that there are remaining resources after the first round of resource allocation, performing a second round of resource allocation in a descending order of priorities of the logical channels, until the resources are exhausted or all logical channels are allocated with resources.

The moment when the CSI MAC CE is triggered, is a moment when the UE receives SCI including a CSI indication.

According to a second aspect, one embodiments of the present disclosure provides an information processing device, applied to a user equipment (UE), including:
a first processing module configured to, for a new data transmission resource of a sidelink interface, select a sidelink destination ID according to a CSI MAC CE of the sidelink interface; or,
a second processing module configured to, for the new data transmission resource of the sidelink interface, in case that a transport block (TB) transmitted at the new data transmission resource includes a CSI MAC CE, perform a packet discard decision according to the included CSI MAC CE.

The first processing module includes:
a first determining submodule configured to, in case that only CSI MAC CEs need to be transmitted on the sidelink interface, select a CSI MAC CE with a highest priority from the CSI MAC CEs, as a first target, and take a sidelink destination ID corresponding to the first target as the sidelink destination ID; or,
a second determining sub-module configured to, in case that both CSI MAC CEs and logical channel data need to be transmitted simultaneously on the sidelink interface, compare priorities of the CSI MAC CEs and logical channels to determine a first target with a highest priority, and take a sidelink destination ID corresponding to the first target as the sidelink destination ID.

In case that the first target includes at least one CSI MAC CE, when the first determining submodule or second determining submodule takes the sidelink destination ID corresponding to the first target as the sidelink destination ID, the first determining submodule or second determining submodule is specifically configured to:

select a target CSI MAC CE from the at least one CSI MAC CE according to UE implementation, and take a sidelink destination ID corresponding to the target CSI MAC CE as the sidelink destination ID; or, for each CSI MAC CE, calculate a difference A1 between a moment when the CSI MAC CE is triggered and a moment of a new data transmission on the sidelink interface, and calculate a difference A2 between a latency bound corresponding to the CSI MAC CE and the A1, and select a sidelink destination ID corresponding to a CSI MAC CE with a smallest A2 as the sidelink destination ID; or, for each CSI MAC CE, determine a logical channel with a highest priority, which belongs to the same destination ID as each CSI MAC CE; compare the priorities of the logical channels with the highest priorities selected for each CSI MAC CE to determine a target logical channel, and take a sidelink destination ID corresponding to the target logical channel as the sidelink destination ID.

The second processing module is specifically configured to, in case that the included CSI MAC CE satisfies a first condition, perform transmission of the TB on the new data transmission resource of the sidelink interface; otherwise, discard the TB.

The selecting the CSI MAC CE with the highest priority from the CSI MAC CEs, as the first target, includes: selecting a CSI MAC CE with a highest priority from CSI MAC CEs that meet a first condition, as the first target; or, the comparing priorities of the CSI MAC CEs and logical channels to determine the first target with the highest priority, includes: determining CSI MAC CEs that satisfy a first condition, comparing priorities of all the CSI MAC CEs that meet the first condition and the logical channels to determine the first target with the highest priority.

The first condition includes:

a timer is started at a moment when a CSI MAC CE is triggered, and the timer does not expire at a moment of a new data transmission on the sidelink interface, wherein a duration of the timer is equal to a latency bound of the CSI MAC CE; or, a difference between the moment of the new data transmission on the sidelink interface and the moment when the CSI MAC CE is triggered, is less than or equal to the latency bound of the CSI MAC CE.

The comparing priorities of the CSI MAC CEs and logical channels to determine the first target with the highest priority, includes: determining logical channels that satisfy a second condition, comparing priorities of the CSI MAC CE and all the logical channels that meet the second condition to determine the first target with the highest priority; or, for each CSI MAC CE, the determining the logical channel with the highest priority, which belongs to the same destination ID as each CSI MAC CE, includes: for each CSI MAC CE, determining a logical channel with a highest priority, which belongs to the same destination ID as each CSI MAC CE and satisfies the second condition;

wherein the second condition includes one or more of the following:

in case that the new data transmission resource of the sidelink interface is a Type1 pre-configured grant, an LCP restriction parameter of the logical channel includes a Type1 preconfigured grant;

in case that the new data transmission resource of the sidelink interface is a pre-configured grant, an LCP restriction parameter of the logical channel includes an index of the preconfigured grant;

there is data transmittable on the logical channel;

the number of available tokens in a token bucket corresponding to the logical channel is greater than zero.

According to a third aspect, one embodiments of the present disclosure provides information processing apparatus applied to a user equipment (UE), including: a transceiver, a memory, a processor, and a program stored on the memory and executable on the processor. The processor is configured to read the program and execute the following steps:

for a new data transmission resource of a sidelink interface, selecting a sidelink destination ID according to a CSI MAC CE of the sidelink interface; or, for the new data transmission resource of the sidelink interface, in case that a transport block (TB) transmitted at the new data transmission resource includes a CSI MAC CE, performing a packet discard decision according to the included CSI MAC CE.

The processor is further configured to read the program and execute the following steps:

in case that only CSI MAC CEs need to be transmitted on the sidelink interface, selecting a CSI MAC CE with a highest priority from the CSI MAC CEs, as a first target, and taking a sidelink destination ID corresponding to the first target as the sidelink destination ID; or, in case that both CSI MAC CEs and logical channel data need to be transmitted simultaneously on the sidelink interface, comparing priorities of the CSI MAC CEs and logical channels to determine a first target with a highest priority, and taking a sidelink destination ID corresponding to the first target as the sidelink destination ID.

In case that the first target includes at least one CSI MAC CE, the processor is further configured to read the program and execute the following steps:

selecting a target CSI MAC CE from the at least one CSI MAC CE according to UE implementation, and taking a sidelink destination ID corresponding to the target CSI MAC CE as the sidelink destination ID; or, for each CSI MAC CE, calculating a difference A1 between a moment when the CSI MAC CE is triggered and a moment of a new data transmission on the sidelink interface, and calculating a difference A2 between a latency bound corresponding to the CSI MAC CE and the A1, and selecting a sidelink destination ID corresponding to a CSI MAC CE with a smallest A2 as the sidelink destination ID; or, for each CSI MAC CE, determining a logical channel with a highest priority, which belongs to the same destination ID as each CSI MAC CE; comparing the priorities of the logical channels with the highest priorities selected for each CSI MAC CE to determine a target logical channel, and taking a sidelink destination ID corresponding to the target logical channel as the sidelink destination ID.

The processor is further configured to read the program and execute the following steps: in case that the included CSI MAC CE satisfies a first condition, performing transmission of the TB on the new data transmission resource of the sidelink interface; otherwise, discarding the TB.

The selecting the CSI MAC CE with the highest priority from the CSI MAC CEs, as the first target, includes: selecting a CSI MAC CE with a highest priority from CSI MAC CEs that meet a first condition, as the first target; or, the comparing priorities of the CSI MAC CEs and logical channels to determine the first target with the highest priority, includes: determining CSI MAC CEs that satisfy a first condition, comparing priorities of all the CSI MAC CEs that meet the first condition and the logical channels to determine the first target with the highest priority.

The first condition includes:
a timer is started at a moment when a CSI MAC CE is triggered, and the timer does not expire at a moment of a new data transmission on the sidelink interface, wherein a duration of the timer is equal to a latency bound of the CSI MAC CE; or,
a difference between the moment of the new data transmission on the sidelink interface and the moment when the CSI MAC CE is triggered, is less than or equal to the latency bound of the CSI MAC CE.

The processor is further configured to read the program and execute the following steps:
receiving configuration information from a network device, wherein the configuration information is configured to configure the latency bound of the CSI MAC CE, and the latency bound of the CSI MAC CE is configured according to at least one of the following manners:
configured based on the UE;
configured based on a destination ID of the UE's sidelink interface;
configured based on a source ID and a destination ID of the UE's sidelink interface;
configured based on a destination ID and a cast type of the UE's sidelink interface;
configured based on a source ID, a destination ID and a cast type of the UE's sidelink interface.

The configuration information further includes at least one of the following information:
HARQ feedback configuration corresponding to the CSI MAC CE;
priority of the CSI MAC CE;
scheduling request resource configuration corresponding to the CSI MAC CE;
wherein the HARQ feedback configuration is configured to configure enabling or disabling HARQ feedback for the CSI MAC CE.

The processor is further configured to read the program and execute the following steps: determining the latency bound of the CSI MAC CE according to an agreement.

The agreement further includes at least one of the following information:
HARQ feedback configuration corresponding to the CSI MAC CE;
priority of the CSI MAC CE;
scheduling request resource configuration corresponding to the CSI MAC CE;
wherein the HARQ feedback configuration is configured to configure enabling or disabling HARQ feedback for the CSI MAC CE.

The comparing priorities of the CSI MAC CEs and logical channels to determine the first target with the highest priority, includes: determining logical channels that satisfy a second condition, comparing priorities of the CSI MAC CE and all the logical channels that meet the second condition to determine the first target with the highest priority; or,
for each CSI MAC CE, the determining the logical channel with the highest priority, which belongs to the same destination ID as each CSI MAC CE, includes: for each CSI MAC CE, determining a logical channel with a highest priority, which belongs to the same destination ID as each CSI MAC CE and satisfies the second condition;
wherein the second condition includes one or more of the following:
in case that the new data transmission resource of the sidelink interface is a Type1 pre-configured grant, an LCP restriction parameter of the logical channel includes a Type1 preconfigured grant;
in case that the new data transmission resource of the sidelink interface is a pre-configured grant, an LCP restriction parameter of the logical channel includes an index of the preconfigured grant;
there is data transmittable on the logical channel;
the number of available tokens in a token bucket corresponding to the logical channel is greater than zero.

The processor is further configured to read the program and execute the following steps:
for a selected sidelink destination ID, determining CSI MAC CEs allowed to be transmitted in the sidelink destination ID, wherein the CSI MAC CEs allowed to be transmitted in the sidelink destination ID are triggered by sidelink interface control information (SCI) for scheduling the sidelink destination ID, and satisfy at least one of the following conditions:
a timer is started at a moment when the CSI MAC CE is triggered, and the timer does not expire at a moment of a new data transmission on the sidelink interface, wherein a duration of the timer is equal to a latency bound of the CSI MAC CE;
a difference between the moment of the new data transmission on the sidelink interface and the moment when the CSI MAC CE is triggered, is less than or equal to the latency bound of the CSI MAC CE.

The processor is further configured to read the program and execute the following steps:
when performing resource allocation in the sidelink destination ID, performing a first round of resource allocation according to a descending order of priorities of CSI MAC CEs and/or logical channels;
wherein during the first round of resource allocation, allocation of resources to the logical channels is limited by prioritized bit rate (PBR) of the logical channels, and allocation of resources to the CSI MAC CE is not limited by the PBR.

The processor is further configured to read the program and execute the following steps:
in case that there are remaining resources after the first round of resource allocation, performing a second round of resource allocation in a descending order of priorities of the logical channels, until the resources are exhausted or all logical channels are allocated with resources.

The moment when the CSI MAC CE is triggered, is a moment when the UE receives SCI including a CSI indication.

According to a fourth aspect, one embodiments of the present disclosure provides a computer-readable storage medium, including a program stored thereon; wherein the program is executed by a processor to implement the steps in the foregoing information processing method.

In the embodiments of the present disclosure, for the new data transmission resource of the sidelink interface, when selecting the sidelink destination ID or when the physical layer transmits a transmission block including the CSI MAC CE, the latency bound of the CSI MAC CE needs to be considered. Therefore, according to the solution of the embodiment of the present disclosure, it can be ensured that CSI MAC CEs transmitted on the sidelink interface are all CSI MAC CEs that satisfy latency bounds of corresponding CSI MAC CEs, thereby avoiding unnecessary transmissions of CSI MAC CEs.

BRIEF DESCRIPTION OF THE DRAWINGS

In order to illustrate technical solutions according to embodiments of the present disclosure more clearly, drawings to be used in the description of the embodiments will be described briefly hereinafter. Apparently, the drawings described hereinafter are only some embodiments of the present disclosure, and other drawings may be obtained by those skilled in the art according to those drawings without creative work.

DETAILED DESCRIPTION

The technical solutions in the embodiments of the present disclosure will be described hereinafter in a clear and complete manner in conjunction with the accompanying drawings. Obviously, the following embodiments are merely a part of, rather than all of, the embodiments of the present disclosure, and based on these embodiments, a person skilled in the art may obtain the other embodiments, which also fall within the scope of the present disclosure.

Figure 1:
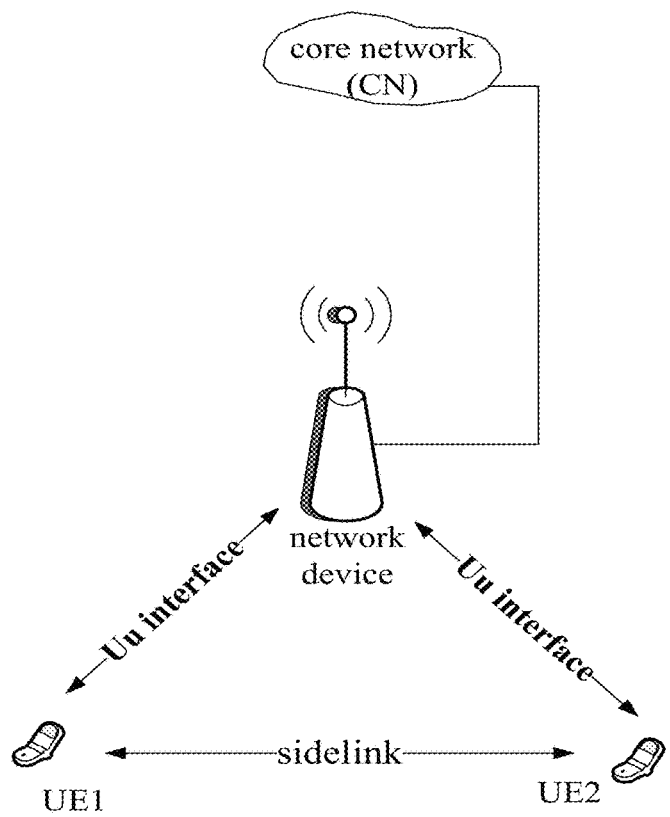
FIG. 1 is a schematic diagram of sidelink in related art.
Figure 2:
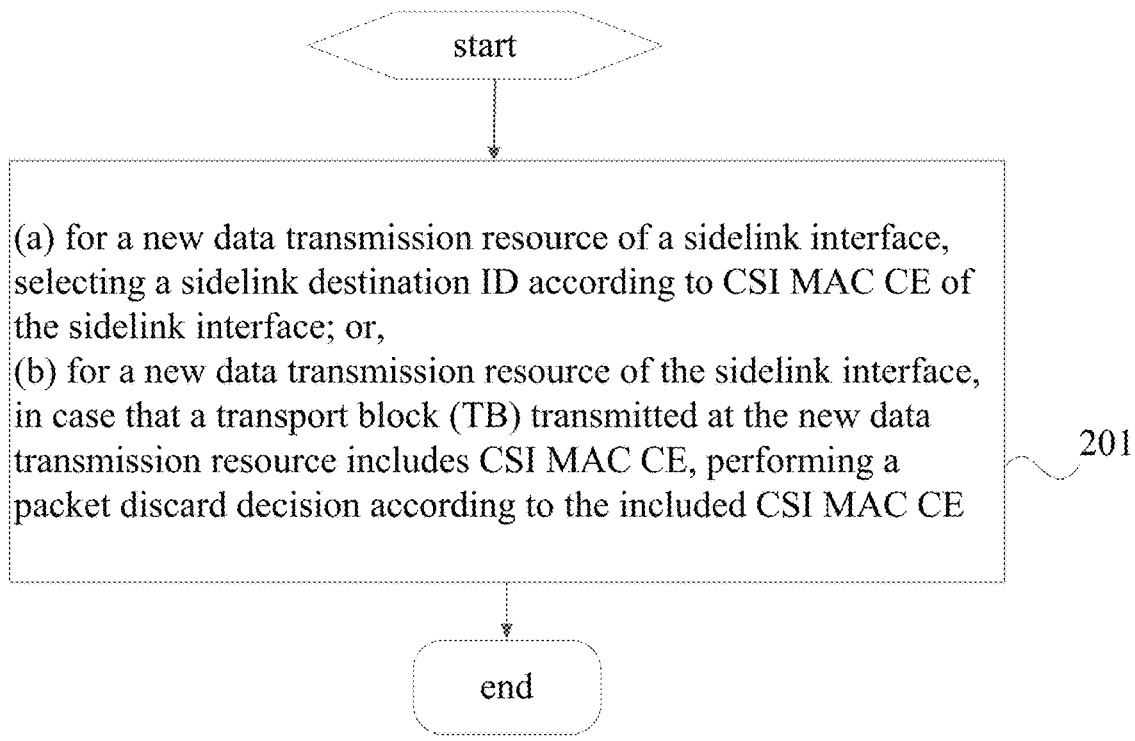
FIG. 2 is a first flowchart of an information processing method according to an embodiment of the present disclosure.

Referring to FIG. 2, FIG. 2 is a flowchart of an information processing method according to an embodiment of the present disclosure, which is performed by a user equipment (UE). As shown in FIG. 2, the method includes the following steps.

Step 201: (a) for a new data transmission resource of a sidelink interface, selecting a sidelink destination ID according to CSI MAC CE of the sidelink interface; or, (b) for a new data transmission resource of the sidelink interface, in case that a transport block (TB) transmitted at the new data transmission resource includes CSI MAC CE, performing a packet discard decision according to the included CSI MAC CE.

New data transmission refers to a first data transmission between sidelink terminals, and the new data transmission resource refers to a resource used for the first data transmission.

The selecting a sidelink destination ID in the step 201(a), in one embodiment of the present disclosure, may include the following situations:

Case 1: in case that only the CSI MAC CE needs to be transmitted on the sidelink interface, selecting a CSI MAC CE with the highest priority from CSI MAC CEs that meet a first condition, as a first target, and taking a sidelink destination ID corresponding to the first target as the sidelink destination ID;

Case 2: in case that both CSI MAC CE and logical channel data need to be transmitted simultaneously on the sidelink interface, determining CSI MAC CEs that satisfy a first condition and logical channels that satisfy a second condition, comparing priorities of all the CSI MAC CEs and logical channels that meet the conditions to determine a first target with the highest priority, and taking a sidelink destination ID corresponding to the first target as the sidelink destination ID.

Since both the CSI MAC CE and the logical channel have their own priorities, after determining the MAC CEs that satisfy the first condition and the logical channels that satisfy the second condition, the priorities of the CSI MAC CEs and logical channels that meet the conditions, are compared.

The first condition includes: a timer is started at a moment when the CSI MAC CE is triggered, and the timer does not expire at a moment of a new data transmission on the sidelink interface, where a duration of the timer is equal to a latency bound of the CSI MAC CE; or, a difference between a moment of a new data transmission on the sidelink interface and a moment when the CSI MAC CE is triggered, is less than or equal to the latency bound of the CSI MAC CE. The moment when the CSI MAC CE is triggered, is a moment when the UE receives Sidelink control information (SCI) including a CSI indication.

The second condition includes one or more of the following:
(1) in case that the new data transmission resource of the sidelink interface is a Type1 pre-configured grant, an LCP restriction parameter of the logical channel includes a Type1 preconfigured grant;
(2) in case that the new data transmission resource of the sidelink interface is a pre-configured grant, an LCP restriction parameter of the logical channel includes an index of the preconfigured grant;
(3) there is data transmittable on the logical channel;
(4) the number of available tokens in a token bucket corresponding to the logical channel is greater than zero.

In the foregoing two cases, in case that the first target includes at least one CSI MAC CE, then, the sidelink destination ID corresponding to the first target may be taken as the sidelink destination ID in any of the following ways:
(1) selecting a target CSI MAC CE from the at least one CSI MAC CE according to UE implementation, and taking a sidelink destination ID corresponding to the target CSI MAC CE as the sidelink destination ID; for example, according to the UE's own algorithm, selecting a target CSI MAC CE from the at least one CSI MAC CE;

(2) for each CSI MAC CE, calculating a difference A1 between a moment when the CSI MAC CE is triggered and a moment of a new data transmission on the sidelink interface, and calculating a difference A2 between a latency bound corresponding to the CSI MAC CE and the A1, and selecting a sidelink destination ID corresponding to a CSI MAC CE with the smallest A2 as the sidelink destination ID; where the moment when the CSI MAC CE is triggered, is a moment when the UE receives Sidelink control information (SCI) including a CSI indication;

(3) for each CSI MAC CE, determining a logical channel with a highest priority, which belongs to the same destination ID as each CSI MAC CE and satisfies the second condition; comparing the priorities of the logical channels with the highest priorities selected for each CSI MAC CE to determine a target logical channel, and taking the sidelink destination ID corresponding to the target logical channel as the sidelink destination ID.

For the step 201(*b*), in case that the included CSI MAC CE satisfies the first condition, transmission of the TB is performed on the new data transmission resource of the sidelink interface; otherwise, the TB is discarded.

In some embodiments of the present disclosure, for the new data transmission resource of the sidelink interface, selecting the sidelink destination ID according to CSI MAC CE of the sidelink interface, includes:

in case that only the CSI MAC CE needs to be transmitted on the sidelink interface, selecting a CSI MAC CE with the highest priority from CSI MAC CEs, as a first target, and taking a sidelink destination ID corresponding to the first target as the sidelink destination ID; or, in case that both CSI MAC CE and logical channel data need to be transmitted simultaneously on the sidelink interface, comparing priorities of the CSI MAC CE and the logical channel to determine a first target with the highest priority, and taking a sidelink destination ID corresponding to the first target as the sidelink destination ID.

In some embodiments of the present disclosure, in case that the first target includes at least one CSI MAC CE, taking a sidelink destination ID corresponding to the first target as the sidelink destination ID, includes:

selecting a target CSI MAC CE from the at least one CSI MAC CE according to UE implementation, and taking a sidelink destination ID corresponding to the target CSI MAC CE as the sidelink destination ID; or, for each CSI MAC CE, calculating a difference A1 between a moment when the CSI MAC CE is triggered and a moment of a new data transmission on the sidelink interface, and calculating a difference A2 between a latency bound corresponding to the CSI MAC CE and the A1, and selecting a sidelink destination ID corresponding to a CSI MAC CE with the smallest A2 as the sidelink destination ID; or, for each CSI MAC CE, determining a logical channel with a highest priority, which belongs to the same destination ID as each CSI MAC CE; comparing the priorities of the logical channels with the highest priorities selected for each CSI MAC CE to determine a target logical channel, and taking the sidelink destination ID corresponding to the target logical channel as the sidelink destination ID.

In some embodiments of the present disclosure, the selecting a CSI MAC CE with the highest priority from CSI MAC CEs, as the first target, includes: selecting a CSI MAC CE with the highest priority from CSI MAC CEs that meet a first condition, as a first target;

or, the comparing priorities of the CSI MAC CE and the logical channel to determine a first target with the highest priority, includes: determining CSI MAC CEs that satisfy a first condition, comparing priorities of all the CSI MAC CEs that meet the condition and the logical channel to determine a first target with the highest priority.

In some embodiments of the present disclosure, the comparing priorities of the CSI MAC CE and the logical channel to determine a first target with the highest priority, includes: determining logical channels that satisfy a second condition, comparing priorities of the CSI MAC CE and all the logical channels that meet the condition to determine a first target with the highest priority; or, for each CSI MAC CE, determining a logical channel with a highest priority, which belongs to the same destination ID as each CSI MAC CE, includes: for each CSI MAC CE, determining a logical channel with a highest priority, which belongs to the same destination ID as each CSI MAC CE and satisfies the second condition.

In some embodiments of the present disclosure, the latency bound of CSI MAC CE may be determined in the following manners.

(1) Configured by the network device. That is, the UE receives configuration information from the network device, where the configuration information is configured to configure the latency bound of the CSI MAC CE. The latency bound of the CSI MAC CE is configured according to at least one of the following manners:

configured based on the UE;

configured based on a destination ID of the UE's sidelink interface;

configured based on a source ID and a destination ID of the UE's sidelink interface;

configured based on a destination ID and a cast type of the UE's sidelink interface;

configured based on a source ID, a destination ID and a cast type of the UE's sidelink interface.

In addition, the configuration information may further include at least one of the following information:

HARQ feedback configuration corresponding to the CSI MAC CE;

priority of the CSI MAC CE;

scheduling request resource configuration corresponding to the CSI MAC CE;

where the HARQ feedback configuration is configured to configure enabling or disabling HARQ feedback for the CSI MAC CE; and the cast type includes unicast, multicast, broadcast, and the like.

(2) Agreed by agreement. That is, in some embodiments of the present disclosure, the latency bound of the CSI MAC CE can be determined according to the agreement. The agreement can further include at least one of the following information:

HARQ feedback configuration corresponding to the CSI MAC CE;

priority of the CSI MAC CE;

scheduling request resource configuration corresponding to the CSI MAC CE;

where the HARQ feedback configuration is configured to configure enabling or disabling HARQ feedback for the CSI MAC CE.

In the embodiments of the present disclosure, for the new data transmission resource of the sidelink interface, when selecting the sidelink destination ID or when the physical layer transmits a transmission block including the CSI MAC CE, the latency bound of the CSI MAC CE needs to be considered. Therefore, according to the solution of the embodiment of the present disclosure, it can be ensured that CSI MAC CEs transmitted on the sidelink interface are all CSI MAC CEs that satisfy the latency bound of the CSI MAC CE, thereby avoiding unnecessary transmissions of CSI MAC CEs.

On the basis of the foregoing embodiment, the step 201(a) may further include:

for the selected sidelink destination ID, determining CSI MAC CEs allowed to be transmitted in the sidelink destination ID, where the CSI MAC CEs allowed to be transmitted in the sidelink destination ID are triggered by sidelink interface control information (SCI) for scheduling the sidelink destination ID, and satisfy at least one of the following conditions:

a timer is started at a moment when the CSI MAC CE is triggered, and the timer does not expire at a moment of a new data transmission on the sidelink interface, where a duration of the timer is equal to a latency bound of the CSI MAC CE;

a difference between a moment of a new data transmission on the sidelink interface and a moment when the CSI MAC CE is triggered, is less than or equal to the latency bound of the CSI MAC CE.

The moment when the CSI MAC CE is triggered, is a moment when the UE receives Sidelink control information (SCI) including a CSI indication.

On the basis of the foregoing embodiment, resource allocation can further be performed. Specifically, when performing resource allocation in the sidelink destination ID, a first round of resource allocation is performed according to a descending order of priorities of CSI MAC CEs and/or logical channels. During the first round of resource allocation, allocation of resources to the logical channel is limited by prioritized bit rate (PBR) of the logical channel, and allocation of resources to the CSI MAC CE is not limited by the PBR.

In case that there are remaining resources after the first round of resource allocation, a second round of resource allocation is performed in a descending order of priorities of the logical channels, until the resources are exhausted or all logical channels are allocated with resources.

In the embodiments of the present disclosure, for new data transmission scheduled by Sidelink control Information (SCI), i.e., sidelink interface control information, when selecting a destination ID at an MAC layer or when a data block including CSI MAC CE is transmitted at the physical layer, it is necessary to consider the latency bound of the CSI MAC CE. The implementation process of the information processing method of the embodiments of the present disclosure will be described in details hereinafter in conjunction with different embodiments.

Figure 3:
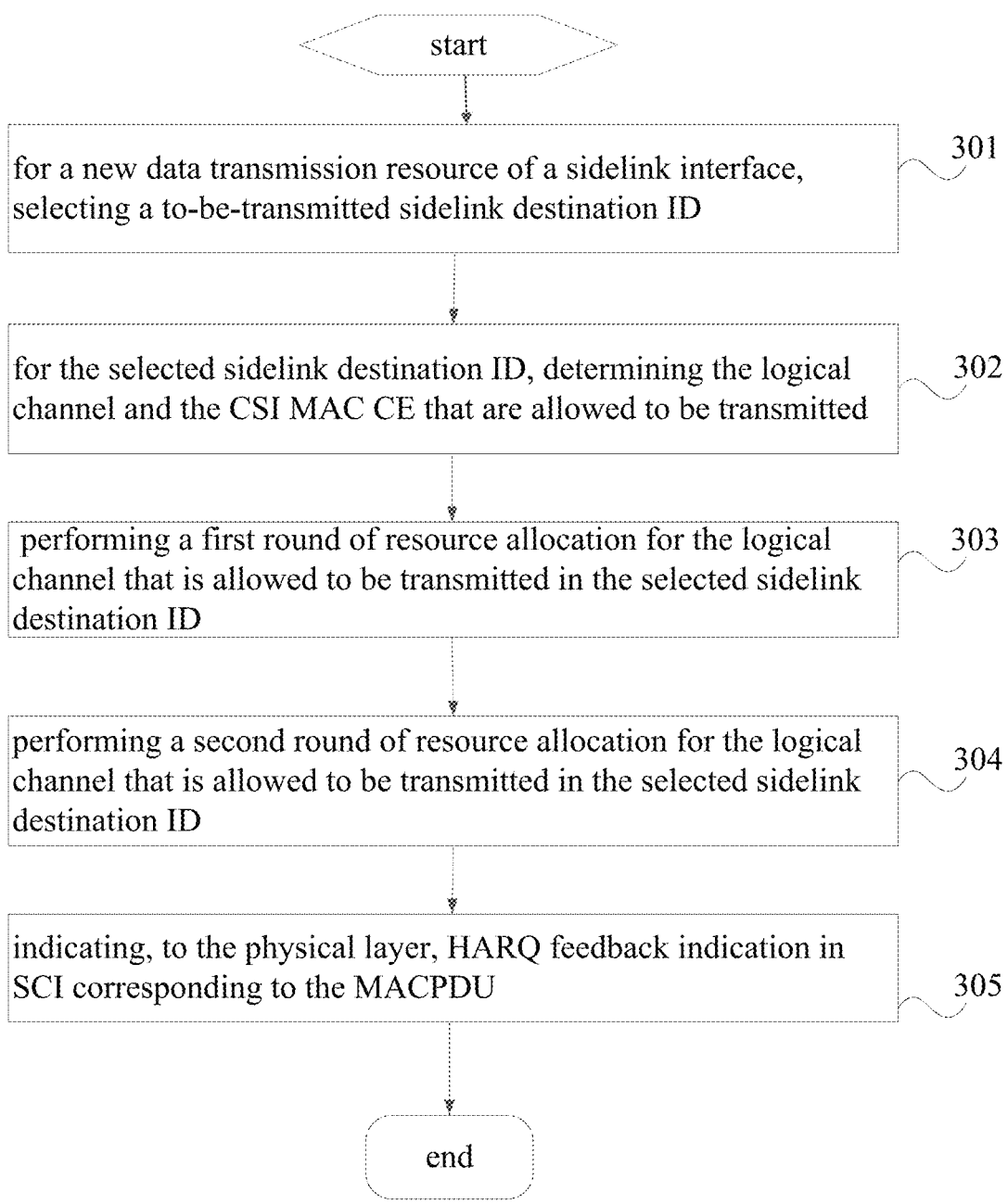
FIG. 3 is a second flowchart of an information processing method according to an embodiment of the present disclosure.

Referring to FIG. 3, FIG. 3 is a flowchart of an information processing method according to an embodiment of the present disclosure. In FIG. 3, description is given with an example in which the latency bound of the CSI MAC CE is taken into consideration when selecting a destination ID at the MAC layer. As shown in FIG. 3, the method includes the following steps.

Step 301: for a new data transmission resource of a sidelink interface, selecting a to-be-transmitted sidelink destination ID.

This step is performed at the MAC layer and is a part of MAC logical channel prioritization (LCP) process.

In case that current transmittable data includes CSI MAC CE, the latency bound of the CSI MAC CE needs to be considered, that is, a CSI MAC CE which satisfies conditions, is selected according to the latency bound of the CSI MAC CE, in one of the following selection manners:

Manner 1: a timer is started at a moment when a CSI MAC CE is triggered, where a duration of the timer is equal to a latency bound of the CSI MAC CE; when selecting a destination ID at the MAC layer, in case that the timer corresponding to the CSI MAC CE does not expire at a transmission moment indicated by the SCI, then it is determined that the CSI MAC CE is a CSI MAC CE which satisfies the conditions;

Manner 2: for new data transmission scheduled by the SCI, a time difference between a transmission moment indicated by the SCI and a moment when each currently pending CSI MAC CE is triggered, is determined; in case that the time difference corresponding to one CSI MAC CE is less than or equal to the latency bound corresponding to the one CSI MAC CE, then it is determined that the CSI MAC CE is a CSI MAC CE which satisfies the conditions.

The latency bound of CSI MAC CE may be determined in the following two manners

Manner 1: determining according to configuration of the network device, which specifically includes the following possibilities:

Manner 1.1: latency bound is configured based on the UE;

Manner 1.2: latency bound is configured based on a destination ID of the UE's sidelink interface;

Manner 1.3: latency bound is configured based on combination of a source ID and a destination ID of the UE's sidelink interface;

Manner 1.4: latency bound is configured based on combination of a destination ID and a cast type of the UE's sidelink interface;

Manner 1.5: latency bound is configured based on combination of a source ID, a destination ID and a cast type of the UE's sidelink interface.

Manner 2: agreed by agreement. That is, a latency bound corresponding to a CSI MAC CE is directly agreed in the agreement.

The moment when the CSI MAC CE is triggered, is a moment when the UE receives SCI including a CSI indication.

Further, the MAC selects a CSI MAC CE or logical channel with the highest priority from CSI MAC CEs that satisfy the conditions and logical channels that satisfy the conditions, and then takes a sidelink interface destination ID corresponding to the selected CSI MAC CE or logical channel as the destination ID.

The priority of CSI MAC CE is determined as follows: when the network configures a CSI MAC CE, a priority of the CSI MAC CE is configured in the configuration information. Alternatively, the priority of the CSI MAC CE is agreed in the agreement, for example, the priority of the CSI MAC CE is always 1.

If there are multiple CSI MAC CEs with the highest priority at the same time, there are following manners to specifically select a sidelink destination ID corresponding to which CSI MAC CE as the sidelink destination ID:

Manner 1: selecting a CSI MAC CE from the multiple CSI MAC CEs with the highest priority, depending on the sidelink UE implementation;

Manner 2: for each CSI MAC CE, calculating a difference A1 between a moment when the CSI MAC CE is triggered and a moment of a new data transmission on the sidelink interface, and calculating a difference A2 between a latency bound corresponding to the CSI MAC CE and the A1, and selecting a CSI MAC CE with the smallest A2;

Manner 3: for each CSI MAC CE, determining a logical channel with a highest priority, which belongs to the same destination ID as each CSI MAC CE and satisfies certain condition; comparing the priorities of the logical channels with the highest priorities selected for each CSI MAC CE to determine a target logical channel, and selecting a CSI MAC CE, which belongs to the same sidelink destination ID as target logical channel.

The condition that the foregoing logical channel needs to satisfy, includes but is not limited to one or a combination of the following:

there is data transmittable on the logical channel;

the number of available tokens in a token bucket corresponding to the logical channel is greater than zero (Bj>0);

in case that the new data transmission resource is a Type1 pre-configured grant, configuredSLGrantType1Allowed configured in an LCP restriction parameter of the logical channel needs to be set to allowed;

in case that the new data transmission resource is a pre-configured grant, a preconfigured grant list configured in an LCP restriction parameter corresponding to the logical channel needs to include an index of the preconfigured grant.

Step 302: for the selected sidelink destination ID, determining the logical channel and the CSI MAC CE that are allowed to be transmitted.

The sidelink UE takes a logical channel which belongs to the destination ID and satisfies the following conditions as a logical channel that allows data transmission:

there is data transmittable on the logical channel;

in case that the new data transmission resource is a Type1 pre-configured grant, configuredSLGrantType1Allowed configured in an LCP restriction parameter of the logical channel needs to be set to allowed;

in case that the new data transmission resource is a pre-configured grant, a preconfigured grant list configured in an LCP restriction parameter corresponding to the logical channel needs to include an index of the preconfigured grant;

HARQ feedback configuration of the logical channel is the same as HARQ feedback configuration of a CSI MAC CE or logical channel with a highest priority in the destination ID to which the logical channel belongs.

The sidelink UE takes a CSI MAC CE which belongs to the destination ID and satisfies one of the following conditions as a CSI MAC CE that is allowed to be transmitted:

Condition 1: a timer is started at a moment when the CSI MAC CE is triggered, a duration of the timer is equal to a latency bound of the CSI MAC CE, and the timer does not expire at a moment of transmission of MAC protocol data unit (MAC PDU);

Condition 2: for the CSI MAC CE, a difference between the moment of transmission of the MAC PDU corresponding to the CSI MAC CE and the moment when the CSI MAC CE is triggered, is determined, and the difference is less than or equal to the latency bound corresponding to the CSI MAC CE.

Step 303: performing a first round of resource allocation for the logical channel that is allowed to be transmitted in the selected sidelink destination ID.

The first round of resource allocation is performed for the logical channel and CSI MAC CE selected in the step 302. When performing resource allocation for the logical channel and CSI MAC CE in one sidelink destination ID, resources are allocated for CSI MAC CEs in the first round of resource allocation, and allocation of resources to the CSI MAC CEs is not limited by the PBR. For other logical channels, in the first round of resource allocation, resources are allocated in a descending order of priorities according to PBR requirements.

Step 304: performing a second round of resource allocation for the logical channel that is allowed to be transmitted in the selected sidelink destination ID.

In case that there are remaining resources after the first round of resource allocation in the step 303, resources are allocated to remaining data amount of logical channels that are allowed to be transmitted in the sidelink destination ID in descending order of priorities of the logical channels, until the resources are exhausted or all logical channels are allocated with resources.

MAC PDU is generated according to a resource allocation result.

Step 305: indicating, to the physical layer, HARQ feedback indication in SCI corresponding to the MACPDU.

In case that the MAC PDU includes a CSI MAC CE with the highest priority, the HARQ feedback indication in the SCI is determined according to the HARQ feedback configuration corresponding to the CSI.

Figure 4:
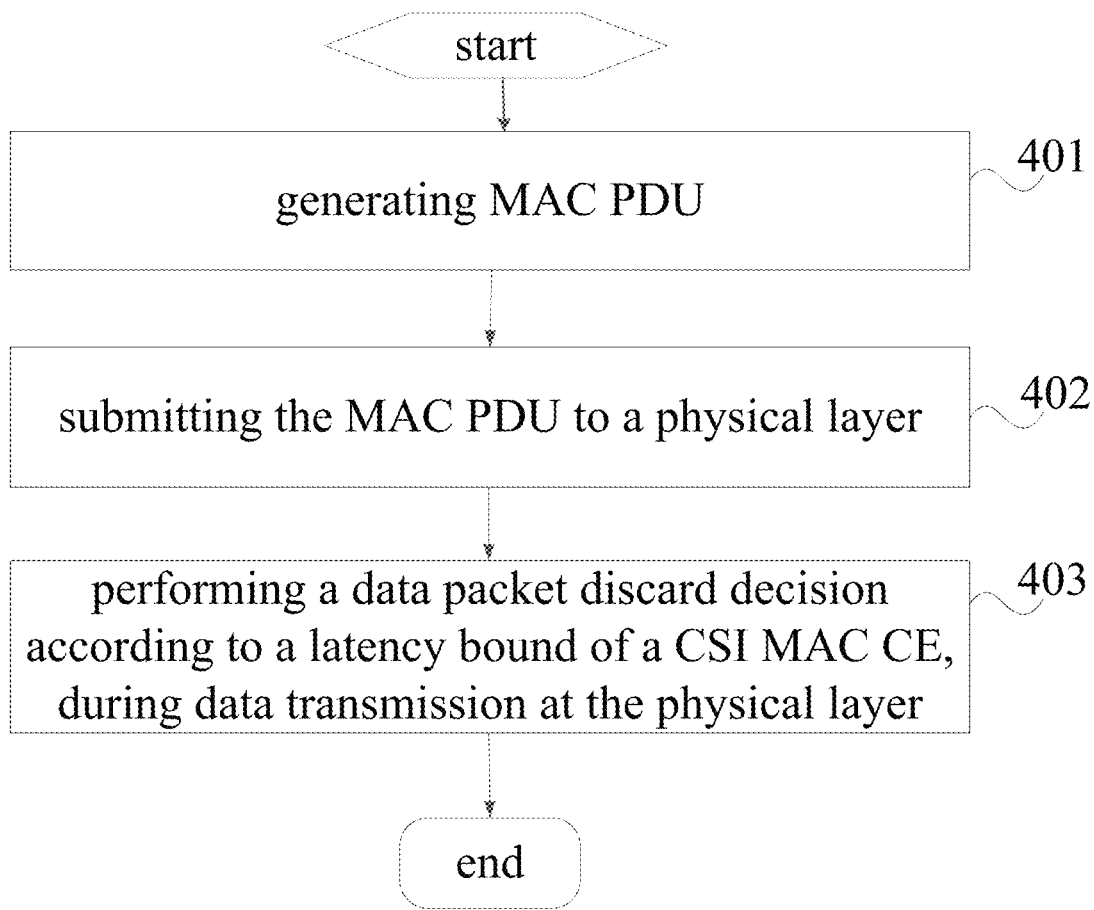
FIG. 4 is a third flowchart of an information processing method according to an embodiment of the present disclosure.

Specifically, the HARQ feedback configuration corresponding to the CSI is determined in the following manners:

When the network device configures the latency bound of the CSI MAC CE, the configuration information further carries the HARQ feedback configuration corresponding to the CSI MAC CE; where the HARQ feedback configuration is to configure, for the CSI MAC CE, enabling/disabling HARQ feedback;

When the latency bound corresponding to the CSI MAC CE is defined in the agreement, the HARQ feedback configuration corresponding to the CSI MAC CE is also defined in the agreement, where the HARQ feedback configuration is to configure, for the CSI MAC CE, enabling/disabling HARQ feedback;

Referring to FIG. 4, FIG. 4 is a flowchart of an information processing method according to an embodiment of the present disclosure. In FIG. 4, description is given with an example in which the latency bound of the CSI MAC CE is taken into consideration when the physical layer transmits data blocks. As shown in FIG. 4, the method includes the following steps.

Step 401: generating MAC PDU.

When the MAC layer selects a sidelink destination ID, the MAC layer selects a sidelink destination ID corresponding to a CSI MAC CE or logical channel with a highest priority, completely according to priorities of CSI MAC CEs and logical channels, and then allocates resources for CSI MAC CEs in the sidelink destination ID and logical channels that satisfy conditions. Determination of the logical channels that satisfy conditions can refer to the embodiment shown in FIG. 3.

Step 402: submitting the MAC PDU to a physical layer.

Step 403: performing a data packet discard decision according to a latency bound of a CSI MAC CE, during data transmission at the physical layer.

In case that the MAC PDU includes a CSI MAC CE, it is needed to consider the latency bound of the CSI MAC CE during data transmission at the physical layer. Specifically, after the physical layer receives the MAC PDU indicated by the MAC, in case that the MAC PDU includes a CSI MAC CE, the MAC PDU is discarded when one of the following conditions is satisfied:

Condition 1: a timer is started at a moment when the CSI MAC CE is triggered, a duration of the timer is equal to a latency bound of the CSI MAC CE, and the timer expires at a moment of transmission of MAC protocol data unit (MAC PDU);

Condition 2: for the CSI MAC CE, a difference between the moment of transmission of the MAC PDU corresponding to the CSI MAC CE and the moment when the CSI MAC CE is triggered, is determined, and the difference is greater than the latency bound corresponding to the CSI MAC CE.

The moment when the CSI MAC CE is triggered, is a moment when the UE receives Sidelink control information (SCI) including a CSI indication.

As can be seen from the above description that the embodiments of the present disclosure can ensure that CSI MAC CEs transmitted on the sidelink interface are all CSI MAC CEs that satisfy the latency bound of the CSI MAC CE, thereby avoiding unnecessary transmissions of CSI MAC CEs.

Figure 5:
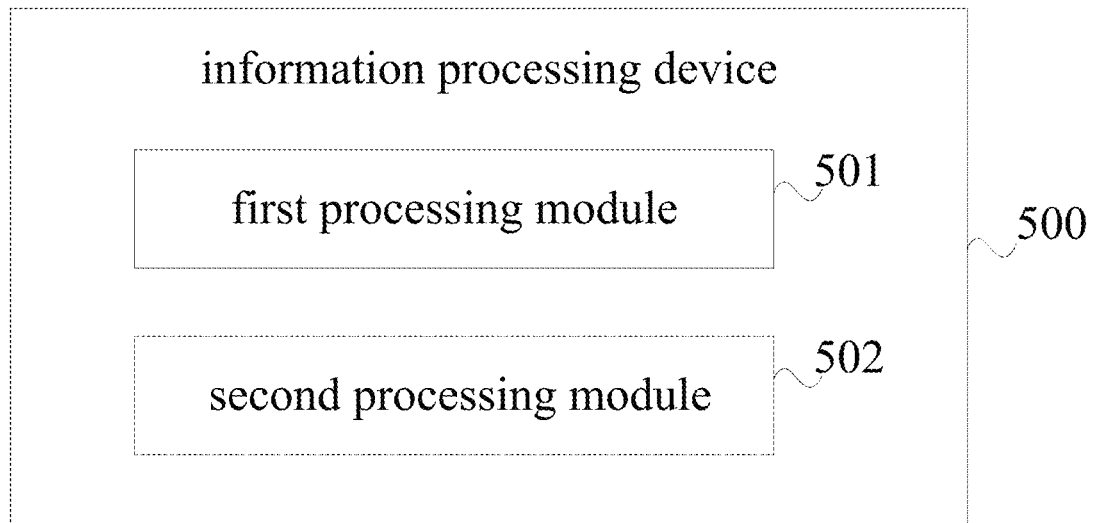
FIG. 5 is a schematic diagram of an information processing device according to an embodiment of the present disclosure.

One embodiment of the present disclosure further provides an information processing device, which is applied to a user equipment (UE). Referring to FIG. 5, FIG. 5 is a schematic diagram of an information processing device according to an embodiment of the present disclosure. Since the principle of the information processing device to solve the problem is similar to that of the information processing method in the embodiment of the present disclosure, implementation of the information processing device can refer to the implementation of the method, and the repetition will not be repeated.

As shown in FIG. 5, the information processing device 500 includes: a first processing module 501 configured to, for a new data transmission resource of a sidelink interface, select a sidelink destination ID according to CSI MAC CE of the sidelink interface; or, a second processing module 502 configured to, for a new data transmission resource of the sidelink interface, in case that a transport block (TB) transmitted at the new data transmission resource includes CSI MAC CE, perform a packet discard decision according to the included CSI MAC CE.

Optionally, the first processing module 501 may include:
a first determining submodule configured to, in case that only the CSI MAC CE needs to be transmitted on the sidelink interface, select a CSI MAC CE with the highest priority from CSI MAC CEs that meet a first condition, as a first target, and take a sidelink destination ID corresponding to the first target as the sidelink destination ID; or, a second determining sub-module configured to, in case that both CSI MAC CE and logical channel data need to be transmitted simultaneously on the sidelink interface, determine CSI MAC CEs that satisfy a first condition and logical channels that satisfy a second condition, compare priorities of all the CSI MAC CEs and logical channels that meet the conditions to determine a first target with the highest priority, and take a sidelink destination ID corresponding to the first target as the sidelink destination ID.

Optionally, in case that the first target includes at least one CSI MAC CE, when the first determining submodule or second determining submodule takes a sidelink destination ID corresponding to the first target as the sidelink destination ID, the first determining submodule or second determining submodule is specifically configured to:
select a target CSI MAC CE from the at least one CSI MAC CE according to UE implementation, and take a sidelink destination ID corresponding to the target CSI MAC CE as the sidelink destination ID; or,
for each CSI MAC CE, calculate a difference A1 between a moment when the CSI MAC CE is triggered and a moment of a new data transmission on the sidelink interface, and calculate a difference A2 between a latency bound corresponding to the CSI MAC CE and the A1, and select a sidelink destination ID corresponding to a CSI MAC CE with the smallest A2 as the sidelink destination ID; or,
for each CSI MAC CE, determine a logical channel with a highest priority, which belongs to the same destination ID as each CSI MAC CE and satisfies the second condition; compare the priorities of the logical channels with the highest priorities selected for each CSI MAC CE to determine a target logical channel, and take the sidelink destination ID corresponding to the target logical channel as the sidelink destination ID.

Optionally, the second processing module 502 is specifically configured to, in case that the included CSI MAC CE satisfies the first condition, perform transmission of the TB on the new data transmission resource of the sidelink interface; otherwise, discard the TB.

Optionally, the first condition includes:
a timer is started at a moment when the CSI MAC CE is triggered, and the timer does not expire at a moment of a new data transmission on the sidelink interface, where a duration of the timer is equal to a latency bound of the CSI MAC CE; or,
a difference between a moment of a new data transmission on the sidelink interface and a moment when the CSI MAC CE is triggered, is less than or equal to the latency bound of the CSI MAC CE.

Optionally, the latency bound of CSI MAC CE may be determined in the following manner:
receiving configuration information from the network device, where the configuration information is configured to configure the latency bound of the CSI MAC CE. The latency bound of the CSI MAC CE is configured according to at least one of the following manners:
configured based on the UE;
configured based on a destination ID of the UE's sidelink interface;
configured based on a source ID and a destination ID of the UE's sidelink interface;
configured based on a destination ID and a cast type of the UE's sidelink interface;
configured based on a source ID, a destination ID and a cast type of the UE's sidelink interface.

Optionally, the configuration information further includes at least one of the following information:
HARQ feedback configuration corresponding to the CSI MAC CE;
priority of the CSI MAC CE;
scheduling request resource configuration corresponding to the CSI MAC CE;
where the HARQ feedback configuration is configured to configure enabling or disabling HARQ feedback for the CSI MAC CE.

Optionally, the latency bound of CSI MAC CE may be determined in the following manner:
   determining the latency bound of the CSI MAC CE according to the agreement.
   Optionally, the agreement can further include at least one of the following information:
   HARQ feedback configuration corresponding to the CSI MAC CE;
   priority of the CSI MAC CE;
   scheduling request resource configuration corresponding to the CSI MAC CE;
   where the HARQ feedback configuration is configured to configure enabling or disabling HARQ feedback for the CSI MAC CE.

Optionally, the second condition includes one or more of the following:
   in case that the new data transmission resource of the sidelink interface is a Type1 pre-configured grant, an LCP restriction parameter of the logical channel includes a Type1 preconfigured grant;
   in case that the new data transmission resource of the sidelink interface is a pre-configured grant, an LCP restriction parameter of the logical channel includes an index of the preconfigured grant;
   there is data transmittable on the logical channel;
   the number of available tokens in a token bucket corresponding to the logical channel is greater than zero.

Optionally, the device may further include: a first determining module configured to, for the selected sidelink destination ID, determine CSI MAC CEs allowed to be transmitted in the sidelink destination ID, where the CSI MAC CEs allowed to be transmitted in the sidelink destination ID are triggered by sidelink interface control information (SCI) for scheduling the sidelink destination ID, and satisfy at least one of the following conditions:
   a timer is started at a moment when the CSI MAC CE is triggered, and the timer does not expire at a moment of a new data transmission on the sidelink interface, where a duration of the timer is equal to a latency bound of the CSI MAC CE;
   a difference between a moment of a new data transmission on the sidelink interface and a moment when the CSI MAC CE is triggered, is less than or equal to the latency bound of the CSI MAC CE.

Optionally, the device may further include: a first allocation module configured to, when performing resource allocation in the sidelink destination ID, perform a first round of resource allocation according to a descending order of priorities of CSI MAC CEs and/or logical channels.
   Where during the first round of resource allocation, allocation of resources to the logical channel is limited by prioritized bit rate (PBR) of the logical channel, and allocation of resources to the CSI MAC CE is not limited by the PBR.

Optionally, the device may further include: a second allocation module configured to, in case that there are remaining resources after the first round of resource allocation, perform a second round of resource allocation in a descending order of priorities of the logical channels, until the resources are exhausted or all logical channels are allocated with resources.

The moment when the CSI MAC CE is triggered, is a moment when the UE receives SCI including a CSI indication.

In some embodiments of the present disclosure, the first processing module includes:

a first determining submodule configured to, in case that only CSI MAC CEs needs to be transmitted on the sidelink interface, select a CSI MAC CE with the highest priority from the CSI MAC CEs, as a first target, and take a sidelink destination ID corresponding to the first target as the sidelink destination ID; or,
a second determining submodule configured to, in case that both CSI MAC CEs and logical channel data need to be transmitted simultaneously on the sidelink interface, compare priorities of the CSI MAC CEs and logical channels to determine a first target with the highest priority, and take a sidelink destination ID corresponding to the first target as the sidelink destination ID.

In some embodiments of the present disclosure, in case that the first target includes at least one CSI MAC CE, when the first determining submodule or second determining submodule takes a sidelink destination ID corresponding to the first target as the sidelink destination ID, the first determining submodule or second determining submodule is specifically configured to:
   select a target CSI MAC CE from the at least one CSI MAC CE according to UE implementation, and take a sidelink destination ID corresponding to the target CSI MAC CE as the sidelink destination ID; or,
   for each CSI MAC CE, calculate a difference A1 between a moment when the CSI MAC CE is triggered and a moment of a new data transmission on the sidelink interface, and calculate a difference A2 between a latency bound corresponding to the CSI MAC CE and the A1, and select a sidelink destination ID corresponding to a CSI MAC CE with the smallest A2 as the sidelink destination ID; or,
   for each CSI MAC CE, determine a logical channel with a highest priority, which belongs to the same destination ID as each CSI MAC CE; compare the priorities of the logical channels with the highest priorities selected for each CSI MAC CE to determine a target logical channel, and take a sidelink destination ID corresponding to the target logical channel as the sidelink destination ID.

In some embodiments of the present disclosure, the second processing module is configured to, in case that the included CSI MAC CE satisfies the first condition, perform transmission of the TB on the new data transmission resource of the sidelink interface; otherwise, discard the TB.

In some embodiments of the present disclosure, the selecting a CSI MAC CE with the highest priority from CSI MAC CEs, as the first target, includes: selecting a CSI MAC CE with the highest priority from CSI MAC CEs that meet a first condition, as a first target; or,
   the comparing priorities of the CSI MAC CE and the logical channel to determine a first target with the highest priority, includes: determining CSI MAC CEs that satisfy a first condition, comparing priorities of all the CSI MAC CEs that meet the condition and the logical channel to determine a first target with the highest priority.

In some embodiments of the present disclosure, the first condition includes:
   a timer is started at a moment when the CSI MAC CE is triggered, and the timer does not expire at a moment of a new data transmission on the sidelink interface, where a duration of the timer is equal to a latency bound of the CSI MAC CE; or,
   a difference between a moment of a new data transmission on the sidelink interface and a moment when the CSI MAC CE is triggered, is less than or equal to the latency bound of the CSI MAC CE.

In some embodiments of the present disclosure, the comparing priorities of the CSI MAC CE and the logical channel to determine a first target with the highest priority, includes: determining logical channels that satisfy a second condition, comparing priorities of the CSI MAC CE and all the logical channels that meet the condition to determine a first target with the highest priority; or, for each CSI MAC CE, determining a logical channel with a highest priority, which belongs to the same destination ID as each CSI MAC CE, includes: for each CSI MAC CE, determining a logical channel with a highest priority, which belongs to the same destination ID as each CSI MAC CE and satisfies the second condition.

The second condition includes one or more of the following:
in case that the new data transmission resource of the sidelink interface is a Type1 pre-configured grant, an LCP restriction parameter of the logical channel includes a Type1 preconfigured grant;
in case that the new data transmission resource of the sidelink interface is a pre-configured grant, an LCP restriction parameter of the logical channel includes an index of the preconfigured grant;
there is data transmittable on the logical channel;
the number of available tokens in a token bucket corresponding to the logical channel is greater than zero.

The device provided in the embodiment of the present disclosure can execute the foregoing method embodiment, and their implementation principles and technical effects are similar, which are not described herein again in this embodiment.

Figure 6:
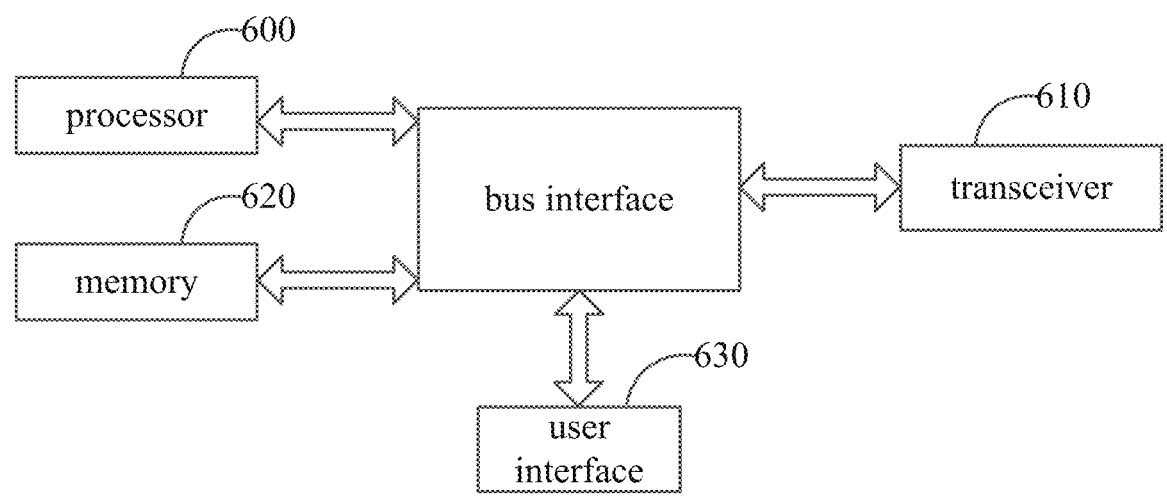
FIG. 6 is a schematic diagram of an information processing apparatus according to an embodiment of the present disclosure.

One embodiment of the present disclosure further provides an information processing apparatus, which is applied to a user equipment (UE). Since the principle of the information processing apparatus to solve the problem is similar to that of the information processing method in the embodiment of the present disclosure, implementation of the information processing apparatus can refer to the implementation of the method, and the repetition will not be repeated. As shown in FIG. 6, the UE in this embodiment of the present disclosure includes: a transceiver 610 and a processor 600 configured to read a program in a memory 620 and execute the following process:
for a new data transmission resource of a sidelink interface, selecting a sidelink destination ID according to CSI MAC CE of the sidelink interface; or,
for a new data transmission resource of the sidelink interface, in case that a transport block (TB) transmitted at the new data transmission resource includes CSI MAC CE, performing a packet discard decision according to the included CSI MAC CE.

The a transceiver 610 is configured to receive and send data under the control of the processor 600.

In FIG. 6, the bus architecture may include any number of interconnected bus and bridge. Specifically, various circuits of one or more processors, which are represented by the processor 600, and one or more memories, which are represented by the memory 320, are linked together. The bus architecture may link various other circuits, such as a peripheral device, voltage regulator and a power management circuit together. These features are well known in this field, therefore, this disclosure does not make further description on these features. The bus interface provides an interface. The transceiver 610 may be multiple elements, including a transmitter and a receiver and provide units, which communicate with other devices on the transmission medium. For different user equipment, a user interface 630 may also be an interface capable of externally/internally connecting with the required devices, the connected devices including but not limited to a keypad, a display, a speaker, a microphone, and a joystick.

The processor 600 is responsible for managing bus architecture and general processing. The memory 620 may store data used by the processor 600 when executing operations.

The processor 600 is further configured to read the program and execute the following steps:
in case that only the CSI MAC CE needs to be transmitted on the sidelink interface, selecting a CSI MAC CE with the highest priority from CSI MAC CEs that meet a first condition, as a first target, and taking a sidelink destination ID corresponding to the first target as the sidelink destination ID; or,
in case that both CSI MAC CE and logical channel data need to be transmitted simultaneously on the sidelink interface, determining CSI MAC CEs that satisfy a first condition and logical channels that satisfy a second condition, comparing priorities of all the CSI MAC CEs and logical channels that meet the conditions to determine a first target with the highest priority, and taking a sidelink destination ID corresponding to the first target as the sidelink destination ID.

In case that the first target includes at least one CSI MAC CE, the processor 600 is further configured to read the program and execute the following steps:
selecting a target CSI MAC CE from the at least one CSI MAC CE according to UE implementation, and taking a sidelink destination ID corresponding to the target CSI MAC CE as the sidelink destination ID; or,
for each CSI MAC CE, calculating a difference A1 between a moment when the CSI MAC CE is triggered and a moment of a new data transmission on the sidelink interface, and calculating a difference A2 between a latency bound corresponding to the CSI MAC CE and the A1, and selecting a sidelink destination ID corresponding to a CSI MAC CE with the smallest A2 as the sidelink destination ID; or,
for each CSI MAC CE, determining a logical channel with a highest priority, which belongs to the same destination ID as each CSI MAC CE and satisfies the second condition; comparing the priorities of the logical channels with the highest priorities selected for each CSI MAC CE to determine a target logical channel, and taking the sidelink destination ID corresponding to the target logical channel as the sidelink destination ID.

The processor 600 is further configured to read the program and execute the following steps:
in case that the included CSI MAC CE satisfies the first condition, performing transmission of the TB on the new data transmission resource of the sidelink interface; otherwise, discarding the TB.

The first condition includes:
a timer is started at a moment when the CSI MAC CE is triggered, and the timer does not expire at a moment of a new data transmission on the sidelink interface, where a duration of the timer is equal to a latency bound of the CSI MAC CE; or,
a difference between a moment of a new data transmission on the sidelink interface and a moment when the CSI MAC CE is triggered, is less than or equal to the latency bound of the CSI MAC CE.

The processor 600 is further configured to read the program and execute the following steps:
  receiving configuration information from the network device, where the configuration information is configured to configure the latency bound of the CSI MAC CE. The latency bound of the CSI MAC CE is configured according to at least one of the following manners:
  configured based on the UE;
  configured based on a destination ID of the UE's sidelink interface;
  configured based on a source ID and a destination ID of the UE's sidelink interface;
  configured based on a destination ID and a cast type of the UE's sidelink interface;
  configured based on a source ID, a destination ID and a cast type of the UE's sidelink interface.

The configuration information further includes at least one of the following information:
  HARQ feedback configuration corresponding to the CSI MAC CE;
  priority of the CSI MAC CE;
  scheduling request resource configuration corresponding to the CSI MAC CE;
  where the HARQ feedback configuration is configured to configure enabling or disabling HARQ feedback for the CSI MAC CE.

The processor 600 is further configured to read the program and execute the following steps:
  determining the latency bound of the CSI MAC CE according to the agreement.

The agreement can further include at least one of the following information:
  HARQ feedback configuration corresponding to the CSI MAC CE;
  priority of the CSI MAC CE;
  scheduling request resource configuration corresponding to the CSI MAC CE;
  where the HARQ feedback configuration is configured to configure enabling or disabling HARQ feedback for the CSI MAC CE.

The second condition includes one or more of the following:
  in case that the new data transmission resource of the sidelink interface is a Type1 pre-configured grant, an LCP restriction parameter of the logical channel includes a Type1 preconfigured grant;
  in case that the new data transmission resource of the sidelink interface is a pre-configured grant, an LCP restriction parameter of the logical channel includes an index of the preconfigured grant;
  there is data transmittable on the logical channel;
  the number of available tokens in a token bucket corresponding to the logical channel is greater than zero.

The processor 600 is further configured to read the program and execute the following steps:
  for the selected sidelink destination ID, determining CSI MAC CEs allowed to be transmitted in the sidelink destination ID, where the CSI MAC CEs allowed to be transmitted in the sidelink destination ID are triggered by sidelink interface control information (SCI) for scheduling the sidelink destination ID, and satisfy at least one of the following conditions:
  a timer is started at a moment when the CSI MAC CE is triggered, and the timer does not expire at a moment of a new data transmission on the sidelink interface, where a duration of the timer is equal to a latency bound of the CSI MAC CE;
  a difference between a moment of a new data transmission on the sidelink interface and a moment when the CSI MAC CE is triggered, is less than or equal to the latency bound of the CSI MAC CE.

The processor 600 is further configured to read the program and execute the following steps:
  when performing resource allocation in the sidelink destination ID, performing a first round of resource allocation according to a descending order of priorities of CSI MAC CEs and/or logical channels;
  where during the first round of resource allocation, allocation of resources to the logical channel is limited by prioritized bit rate (PBR) of the logical channel, and allocation of resources to the CSI MAC CE is not limited by the PBR.

The processor 600 is further configured to read the program and execute the following steps:
  in case that there are remaining resources after the first round of resource allocation, performing a second round of resource allocation in a descending order of priorities of the logical channels, until the resources are exhausted or all logical channels are allocated with resources.

The moment when the CSI MAC CE is triggered, is a moment when the UE receives SCI including a CSI indication.

The apparatus provided in the embodiment of the present disclosure can execute the foregoing method embodiment, and their implementation principles and technical effects are similar, which are not described herein again in this embodiment.

One embodiment of the present disclosure further provides a computer-readable storage medium including a program is stored thereon. The program is executed by a processor to implement each process of the above-mentioned information processing method, with the same technical effect achieved, which will not be repeated here to avoid repetition. The computer-readable storage medium may be, for example, a read-only memory (ROM), a random access memory (RAM), a magnetic disk, or optical disk, etc.

It should be noted that in this article, such terms "include" or "including" and any variations thereof are intended to cover non-exclusive inclusions. For example, a process, method, product or device that includes a series of elements, is not necessarily limited to those clearly listed elements, and may include other elements that are not clearly listed or are inherent to the process, method, product or device. Without further limitation, an element defined by the phrase "including a . . . " does not preclude presence of additional identical elements in a process, method, produce or device that includes the element.

From description of the above embodiments, those skilled in the art can clearly understand that the methods of the above embodiments may be implemented by means of software plus a necessary general hardware platform, and of course, may be implemented by hardware, but in many cases the former is better. On the basis of such an understanding, the technical scheme of the preset disclosure in essence or those contributing to the existing technology in embodiments of the present disclosure can be embodied in the form of software products. The computer software product may be stored in a storage medium (such as a ROM/RAM, a magnetic disk or an optical disc), which may include several instructions to enable a computer device (which may be a mobile phone, a computer, a server, an air conditioner, or a network device, etc.) to perform all or partial of the method in each embodiment of the present disclosure.

It can be understood that those embodiments described in the embodiments of the present disclosure may be implemented by hardware, software, firmware, middleware, microcode, or a combination thereof. For implementation with hardware, units, modules, sub-units and sub-modules may be implemented in one or more application specific integrated circuits (ASIC), a digital signal processor (DSP), a digital signal processing device (DSP Device, DSPD), a programmable logic device (PLD), a field-programmable gate array (PFGA), a general processor, a controller, a micro-controller, a microprocessor, another electronic unit for implementing the functions of the present disclosure, or their combinations.

For implementation by software, technologies described in the embodiments of the present disclosure may be implemented by executing functional modules (for example, a process and a function) in the embodiments of the present disclosure. Software codes can be stored in the memory and executed by the processor. The memory can be implemented inside or outside the processor.

The embodiments of the present disclosure have been described above in conjunction with the accompanying drawings, but the present disclosure is not limited to the above specific embodiments, which are merely illustrative rather than restrictive. Under the inspiration of the present disclosure, without departing from the scope of the present disclosure and the protection scope of the claims, many variations may be made, which all fall within the protection of the present disclosure.

What is claimed is:

1. An information processing method, performed by a user equipment (UE), comprising:
    for a new data transmission resource of a sidelink interface, selecting a sidelink destination ID according to a CSI MAC CE of the sidelink interface; or,
    for the new data transmission resource of the sidelink interface, in case that a transport block (TB) transmitted at the new data transmission resource includes a CSI MAC CE, performing a packet discard decision according to the included CSI MAC CE;
    wherein for the new data transmission resource of the sidelink interface, the selecting the sidelink destination ID according to the CSI MAC CE of the sidelink interface, includes:
    in case that only CSI MAC CEs need to be transmitted on the sidelink interface, selecting a CSI MAC CE with a highest priority from the CSI MAC CEs, as a first target, and taking a sidelink destination ID corresponding to the first target as the sidelink destination ID; or,
    in case that both CSI MAC CEs and logical channel data need to be transmitted simultaneously on the sidelink interface, comparing priorities of the CSI MAC CEs and logical channels to determine a first target with a highest priority, and taking a sidelink destination ID corresponding to the first target as the sidelink destination ID.

2. The method according to claim 1, wherein in case that the first target includes at least one CSI MAC CE, the taking the sidelink destination ID corresponding to the first target as the sidelink destination ID, includes:
    selecting a target CSI MAC CE from the at least one CSI MAC CE according to UE implementation, and taking a sidelink destination ID corresponding to the target CSI MAC CE as the sidelink destination ID; or,
    for each CSI MAC CE, calculating a difference A1 between a moment when the CSI MAC CE is triggered and a moment of a new data transmission on the sidelink interface, and calculating a difference A2 between a latency bound corresponding to the CSI MAC CE and the A1, and selecting a sidelink destination ID corresponding to a CSI MAC CE with a smallest A2 as the sidelink destination ID; or,
    for each CSI MAC CE, determining a logical channel with a highest priority, which belongs to the same destination ID as each CSI MAC CE; comparing the priorities of the logical channels with the highest priorities selected for each CSI MAC CE to determine a target logical channel, and taking a sidelink destination ID corresponding to the target logical channel as the sidelink destination ID.

3. The method according to claim 1, wherein for the new data transmission resource of the sidelink interface, in case that the TB transmitted at the new data transmission resource includes the CSI MAC CE, performing the packet discard decision according to the included CSI MAC CE, includes:
    in case that the included CSI MAC CE satisfies a first condition, performing transmission of the TB on the new data transmission resource of the sidelink interface; otherwise, discarding the TB.

4. The method according to claim 1, wherein the selecting the CSI MAC CE with the highest priority from the CSI MAC CEs, as the first target, includes: selecting a CSI MAC CE with a highest priority from CSI MAC CEs that meet a first condition, as the first target; or,
    the comparing priorities of the CSI MAC CEs and logical channels to determine the first target with the highest priority, includes: determining CSI MAC CEs that satisfy a first condition, comparing priorities of all the CSI MAC CEs that meet the first condition and the logical channels to determine the first target with the highest priority.

5. The method according to claim 3, wherein the first condition includes: a timer is started at a moment when a CSI MAC CE is triggered, and the timer does not expire at a moment of a new data transmission on the sidelink interface, wherein a duration of the timer is equal to a latency bound of the CSI MAC CE; or, a difference between the moment of the new data transmission on the sidelink interface and the moment when the CSI MAC CE is triggered, is less than or equal to the latency bound of the CSI MAC CE;
    wherein the latency bound of the CSI MAC CE is determined in a manner including: receiving configuration information from a network device, wherein the configuration information is configured to configure the latency bound of the CSI MAC CE, and the latency bound of the CSI MAC CE is configured according to at least one of the following manners: configured based on the UE, configured based on a destination ID of the UE's sidelink interface, configured based on a source ID and a destination ID of the UE's sidelink interface, configured based on a destination ID and a cast type of the UE's sidelink interface, or, configured based on a source ID, a destination ID and a cast type of the UE's sidelink interface; wherein the configuration information further includes at least one of the following information: HARQ feedback configuration corresponding to the CSI MAC CE, priority of the CSI MAC CE, or, scheduling request resource configuration corresponding to the CSI MAC CE; wherein the HARQ feedback configuration is configured to configure enabling or disabling HARQ feedback for the CSI MAC CE;

or, wherein the latency bound of the CSI MAC CE is determined in a manner including: determining the latency bound of the CSI MAC CE according to an agreement; wherein the agreement further includes at least one of the following information: HARQ feedback configuration corresponding to the CSI MAC CE, priority of the CSI MAC CE, or, scheduling request resource configuration corresponding to the CSI MAC CE; wherein the HARQ feedback configuration is configured to configure enabling or disabling HARQ feedback for the CSI MAC CE;

or, wherein the moment when the CSI MAC CE is triggered, is a moment when the UE receives SCI including a CSI indication.

6. The method according to claim 2, wherein the comparing priorities of the CSI MAC CEs and logical channels to determine the first target with the highest priority, includes: determining logical channels that satisfy a second condition, comparing priorities of the CSI MAC CE and all the logical channels that meet the second condition to determine the first target with the highest priority; or, for each CSI MAC CE, the determining the logical channel with the highest priority, which belongs to the same destination ID as each CSI MAC CE, includes: for each CSI MAC CE, determining a logical channel with a highest priority, which belongs to the same destination ID as each CSI MAC CE and satisfies the second condition;

wherein the second condition includes one or more of the following:

in case that the new data transmission resource of the sidelink interface is a Type1 pre-configured grant, an LCP restriction parameter of the logical channel includes a Type1 preconfigured grant;

in case that the new data transmission resource of the sidelink interface is a pre-configured grant, an LCP restriction parameter of the logical channel includes an index of the preconfigured grant;

there is data transmittable on the logical channel;

the number of available tokens in a token bucket corresponding to the logical channel is greater than zero.

7. The method according to claim 1, wherein for the new data transmission resource of the sidelink interface, the selecting the sidelink destination ID according to the CSI MAC CE of the sidelink interface, further includes:

for a selected sidelink destination ID, determining CSI MAC CEs allowed to be transmitted in the sidelink destination ID, wherein the CSI MAC CES allowed to be transmitted in the sidelink destination ID are triggered by sidelink interface control information (SCI) for scheduling the sidelink destination ID, and satisfy at least one of the following conditions:

a timer is started at a moment when the CSI MAC CE is triggered, and the timer does not expire at a moment of a new data transmission on the sidelink interface, wherein a duration of the timer is equal to a latency bound of the CSI MAC CE;

a difference between the moment of the new data transmission on the sidelink interface and the moment when the CSI MAC CE is triggered, is less than or equal to the latency bound of the CSI MAC CE;

wherein the moment when the CSI MAC CE is triggered, is a moment when the UE receives SCI including a CSI indication.

8. The method according to claim 1, wherein the method further includes:

when performing resource allocation in the sidelink destination ID, performing a first round of resource allocation according to a descending order of priorities of CSI MAC CEs and/or logical channels;

wherein during the first round of resource allocation, allocation of resources to the logical channels is limited by prioritized bit rate (PBR) of the logical channels, and allocation of resources to the CSI MAC CE is not limited by the PBR;

wherein the method further includes:

in case that there are remaining resources after the first round of resource allocation, performing a second round of resource allocation in a descending order of priorities of the logical channels, until the resources are exhausted or all logical channels are allocated with resources.

9. An information processing apparatus applied to a user equipment (UE), comprising: a transceiver, a memory, a processor, and a program stored on the memory and executable on the processor;

wherein the processor is configured to read the program and execute the following steps:

for a new data transmission resource of a sidelink interface, selecting a sidelink destination ID according to a CSI MAC CE of the sidelink interface; or, for the new data transmission resource of the sidelink interface, in case that a transport block (TB) transmitted at the new data transmission resource includes a CSI MAC CE, performing a packet discard decision according to the included CSI MAC CE;

wherein the processor is further configured to read the program and execute the following steps:

in case that only CSI MAC CEs need to be transmitted on the sidelink interface, selecting a CSI MAC CE with a highest priority from the CSI MAC CEs, as a first target, and taking a sidelink destination ID corresponding to the first target as the sidelink destination ID; or, in case that both CSI MAC CEs and logical channel data need to be transmitted simultaneously on the sidelink interface, comparing priorities of the CSI MAC CEs and logical channels to determine a first target with a highest priority, and taking a sidelink destination ID corresponding to the first target as the sidelink destination ID.

10. The apparatus according to claim 9, wherein in case that the first target includes at least one CSI MAC CE, the processor is further configured to read the program and execute the following steps:

selecting a target CSI MAC CE from the at least one CSI MAC CE according to UE implementation, and taking a sidelink destination ID corresponding to the target CSI MAC CE as the sidelink destination ID; or, for each CSI MAC CE, calculating a difference A1 between a moment when the CSI MAC CE is triggered and a moment of a new data transmission on the sidelink interface, and calculating a difference A2 between a latency bound corresponding to the CSI MAC CE and the A1, and selecting a sidelink destination ID corresponding to a CSI MAC CE with a smallest A2 as the sidelink destination ID; or, for each CSI MAC CE, determining a logical channel with a highest priority, which belongs to the same destination ID as each CSI MAC CE; comparing the priorities of the logical channels with the highest priorities selected for each CSI MAC CE to determine a target logical channel, and taking a sidelink destination ID corresponding to the target logical channel as the sidelink destination ID.

11. The apparatus according to claim 9, wherein the processor is further configured to read the program and execute the following steps:
in case that the included CSI MAC CE satisfies a first condition, performing transmission of the TB on the new data transmission resource of the sidelink interface; otherwise, discarding the TB.

12. The apparatus according to claim 9, wherein the selecting the CSI MAC CE with the highest priority from the CSI MAC CEs, as the first target, includes: selecting a CSI MAC CE with a highest priority from CSI MAC CEs that meet a first condition, as the first target; or,
the comparing priorities of the CSI MAC CEs and logical channels to determine the first target with the highest priority, includes: determining CSI MAC CEs that satisfy a first condition, comparing priorities of all the CSI MAC CEs that meet the first condition and the logical channels to determine the first target with the highest priority.

13. The apparatus according to claim 11, wherein the first condition includes: a timer is started at a moment when a CSI MAC CE is triggered, and the timer does not expire at a moment of a new data transmission on the sidelink interface, wherein a duration of the timer is equal to a latency bound of the CSI MAC CE; or, a difference between the moment of the new data transmission on the sidelink interface and the moment when the CSI MAC CE is triggered, is less than or equal to the latency bound of the CSI MAC CE;
wherein the processor is further configured to read the program and execute the following steps: receiving configuration information from a network device, wherein the configuration information is configured to configure the latency bound of the CSI MAC CE, and the latency bound of the CSI MAC CE is configured according to at least one of the following manners: configured based on the UE, configured based on a destination ID of the UE's sidelink interface, configured based on a source ID and a destination ID of the UE's sidelink interface, configured based on a destination ID and a cast type of the UE's sidelink interface, or, configured based on a source ID, a destination ID and a cast type of the UE's sidelink interface; wherein the configuration information further includes at least one of the following information: HARQ feedback configuration corresponding to the CSI MAC CE, priority of the CSI MAC CE, or, scheduling request resource configuration corresponding to the CSI MAC CE; wherein the HARQ feedback configuration is configured to configure enabling or disabling HARQ feedback for the CSI MAC CE;
or,
wherein the processor is further configured to read the program and execute the following steps: determining the latency bound of the CSI MAC CE according to an agreement; wherein the agreement further includes at least one of the following information: HARQ feedback configuration corresponding to the CSI MAC CE, priority of the CSI MAC CE, or, scheduling request resource configuration corresponding to the CSI MAC CE; wherein the HARQ feedback configuration is configured to configure enabling or disabling HARQ feedback for the CSI MAC CE;
or,
wherein the moment when the CSI MAC CE is triggered, is a moment when the UE receives SCI including a CSI indication.

14. The apparatus according to claim 10, wherein the comparing priorities of the CSI MAC CEs and logical channels to determine the first target with the highest priority, includes: determining logical channels that satisfy a second condition, comparing priorities of the CSI MAC CE and all the logical channels that meet the second condition to determine the first target with the highest priority; or,
for each CSI MAC CE, the determining the logical channel with the highest priority, which belongs to the same destination ID as each CSI MAC CE, includes: for each CSI MAC CE, determining a logical channel with a highest priority, which belongs to the same destination ID as each CSI MAC CE and satisfies the second condition;
wherein the second condition includes one or more of the following:
in case that the new data transmission resource of the sidelink interface is a Type1 pre-configured grant, an LCP restriction parameter of the logical channel includes a Type1 preconfigured grant;
in case that the new data transmission resource of the sidelink interface is a pre-configured grant, an LCP restriction parameter of the logical channel includes an index of the preconfigured grant;
there is data transmittable on the logical channel;
the number of available tokens in a token bucket corresponding to the logical channel is greater than zero.

15. The apparatus according to claim 9, wherein the processor is further configured to read the program and execute the following steps:
for a selected sidelink destination ID, determining CSI MAC CEs allowed to be transmitted in the sidelink destination ID, wherein the CSI MAC CEs allowed to be transmitted in the sidelink destination ID are triggered by sidelink interface control information (SCI) for scheduling the sidelink destination ID, and satisfy at least one of the following conditions:
a timer is started at a moment when the CSI MAC CE is triggered, and the timer does not expire at a moment of a new data transmission on the sidelink interface, wherein a duration of the timer is equal to a latency bound of the CSI MAC CE;
a difference between the moment of the new data transmission on the sidelink interface and the moment when the CSI MAC CE is triggered, is less than or equal to the latency bound of the CSI MAC CE;
wherein the moment when the CSI MAC CE is triggered, is a moment when the UE receives SCI including a CSI indication.

16. The apparatus according to claim 9, wherein the processor is further configured to read the program and execute the following steps:
when performing resource allocation in the sidelink destination ID, performing a first round of resource allocation according to a descending order of priorities of CSI MAC CEs and/or logical channels;
wherein during the first round of resource allocation, allocation of resources to the logical channels is limited by prioritized bit rate (PBR) of the logical channels, and allocation of resources to the CSI MAC CE is not limited by the PBR;
wherein the processor is further configured to read the program and execute the following steps:

in case that there are remaining resources after the first round of resource allocation, performing a second round of resource allocation in a descending order of priorities of the logical channels, until the resources are exhausted or all logical channels are allocated with resources.

17. The method according to claim 4, wherein the first condition includes: a timer is started at a moment when a CSI MAC CE is triggered, and the timer does not expire at a moment of a new data transmission on the sidelink interface, wherein a duration of the timer is equal to a latency bound of the CSI MAC CE; or, a difference between the moment of the new data transmission on the sidelink interface and the moment when the CSI MAC CE is triggered, is less than or equal to the latency bound of the CSI MAC CE;

wherein the latency bound of the CSI MAC CE is determined in a manner including: receiving configuration information from a network device, wherein the configuration information is configured to configure the latency bound of the CSI MAC CE, and the latency bound of the CSI MAC CE is configured according to at least one of the following manners: configured based on the UE, configured based on a destination ID of the UE's sidelink interface, configured based on a source ID and a destination ID of the UE's sidelink interface, configured based on a destination ID and a cast type of the UE's sidelink interface, or, configured based on a source ID, a destination ID and a cast type of the UE's sidelink interface; wherein the configuration information further includes at least one of the following information: HARQ feedback configuration corresponding to the CSI MAC CE, priority of the CSI MAC CE, or, scheduling request resource configuration corresponding to the CSI MAC CE; wherein the HARQ feedback configuration is configured to configure enabling or disabling HARQ feedback for the CSI MAC CE;

or, wherein the latency bound of the CSI MAC CE is determined in a manner including: determining the latency bound of the CSI MAC CE according to an agreement; wherein the agreement further includes at least one of the following information: HARQ feedback configuration corresponding to the CSI MAC CE, priority of the CSI MAC CE, or, scheduling request resource configuration corresponding to the CSI MAC CE; wherein the HARQ feedback configuration is configured to configure enabling or disabling HARQ feedback for the CSI MAC CE;

or, wherein the moment when the CSI MAC CE is triggered, is a moment when the UE receives SCI including a CSI indication.

18. The apparatus according to claim 12, wherein the first condition includes: a timer is started at a moment when a CSI MAC CE is triggered, and the timer does not expire at a moment of a new data transmission on the sidelink interface, wherein a duration of the timer is equal to a latency bound of the CSI MAC CE; or, a difference between the moment of the new data transmission on the sidelink interface and the moment when the CSI MAC CE is triggered, is less than or equal to the latency bound of the CSI MAC CE;

wherein the processor is further configured to read the program and execute the following steps: receiving configuration information from a network device, wherein the configuration information is configured to configure the latency bound of the CSI MAC CE, and the latency bound of the CSI MAC CE is configured according to at least one of the following manners: configured based on the UE, configured based on a destination ID of the UE's sidelink interface, configured based on a source ID and a destination ID of the UE's sidelink interface, configured based on a destination ID and a cast type of the UE's sidelink interface, or, configured based on a source ID, a destination ID and a cast type of the UE's sidelink interface; wherein the configuration information further includes at least one of the following information: HARQ feedback configuration corresponding to the CSI MAC CE, priority of the CSI MAC CE, or, scheduling request resource configuration corresponding to the CSI MAC CE; wherein the HARQ feedback configuration is configured to configure enabling or disabling HARQ feedback for the CSI MAC CE;

or, wherein the processor is further configured to read the program and execute the following steps: determining the latency bound of the CSI MAC CE according to an agreement; wherein the agreement further includes at least one of the following information: HARQ feedback configuration corresponding to the CSI MAC CE, priority of the CSI MAC CE, or, scheduling request resource configuration corresponding to the CSI MAC CE; wherein the HARQ feedback configuration is configured to configure enabling or disabling HARQ feedback for the CSI MAC CE;

or, wherein the moment when the CSI MAC CE is triggered, is a moment when the UE receives SCI including a CSI indication.

* * * * *